United States Patent [19]
Kraty et al.

[11] 3,879,667
[45] Apr. 22, 1975

[54] APPARATUS AND METHODS FOR DETECTING PHYSICAL PARAMETERS

[75] Inventors: Nigel P. Kraty, Maidenhead; Robert E. Turner, Henfield, both of England

[73] Assignee: Graviner (Colnbrook) Limited, London, England

[22] Filed: Dec. 16, 1971

[21] Appl. No.: 208,766

[30] Foreign Application Priority Data
Dec. 18, 1970 United Kingdom............ 60164/70

[52] U.S. Cl. .................. 328/6; 328/1; 340/228; 23/232 C
[51] Int. Cl. ........................................ H03k 17/00
[58] Field of Search..... 23/254 EF, 232 C; 340/228, 340/228.1, 237 S; 431/25, 78; 324/111, 99; 328/6

[56] References Cited
UNITED STATES PATENTS

| | | | |
|---|---|---|---|
| 2,112,736 | 3/1938 | Cockrell | 340/228.1 |
| 2,600,928 | 6/1952 | Semm | 340/228.1 |
| 2,607,528 | 8/1952 | McWhirter et al. | 324/111 X |
| 3,078,450 | 2/1963 | Bressler | 340/237 S |
| 3,095,278 | 6/1963 | Green, Jr. | 23/254 EF |
| 3,175,886 | 3/1965 | Krzeminsk et al. | 23/254 EF |
| 3,301,307 | 1/1967 | Nishigaki et al. | 340/228.1 X |
| 3,302,685 | 2/1967 | Ono et al. | 431/25 X |
| 3,372,000 | 3/1968 | Gallaway et al. | 23/254 EF |
| 3,423,181 | 1/1969 | Dimick et al. | 23/254 EF |

OTHER PUBLICATIONS
Scott, R. P. W., Manufacturing Chemist, Oct. 1958, pp. 411–416.
Lovelock, J. E., Nature 188, Oct. 29, 1960, No. 4748, p. 401.

*Primary Examiner*—Michael J. Lynch
*Assistant Examiner*—B. P. Davis
*Attorney, Agent, or Firm*—Wolfe, Hubbard, Leydig, Voit & Osann, Ltd.

[57] ABSTRACT

Two electrodes made of material having the same equilibrium oxygen partial pressure are mounted to be heated to different temperatures by a flame whose presence is to be detected. It is found that a detectable electrical potential difference is generated between the electrodes when the flame is present. Instead, the electrodes can be made of material having different equilibrium oxygen partial pressures and in such a case can be mounted to be heated to the same temperature by the flame. In another embodiment, the two electrodes of material having different equilibrium oxygen partial pressures are mounted in a chamber subjected to ionising radiations, and the potential difference is dependent on the oxygen partial pressure in the chamber and the temperature therein.

15 Claims, 5 Drawing Figures

PATENTED APR 22 1975     3,879,667

APPARATUS AND METHODS FOR DETECTING PHYSICAL PARAMETERS

The invention relates to apparatus and methods for detecting a physical parameter.

According to the invention, there is provided a method of detecting a physical parameter, including the step of establishing different oxygen partial pressures at two electrodes and the step of establishing an electrolyte between the electrodes, whereby an electrical potential difference appears between the electrodes, at least one of the said steps being affected by the said parameter so that the potential difference is dependent on the parameter.

According to the invention, there is also provided apparatus for carrying out the said method.

According to the invention, there is further provided flame detecting apparatus, comprising a pair of electrodes made of the same oxidisable material and so mounted in relation to the source of flame as to be held at different temperatures by the flame when present, and high input impedance detection circuitry for detecting the potential difference appearing between the electrode when the flame is present.

According to the invention, there is yet further provided flame detecting apparatus, comprising a pair of electrodes made of different oxidisable material and so mounted in relation to the source of flame as to be held at substantially the same temperature by the flame when present, and high input impedance detection circuitry for detecting the potential difference appearing between the electrodes when the flame is present.

According to the invention, there is still further provided flame detecting apparatus, comprising a pair of electrodes made of different oxidisable material and so mounted in relation to the source of flame as to be held at different temperatures by the flame when present, and high input impedance detection circuitry for detecting the potential difference between the electrodes when the flame is present.

According to the invention, there is also provided apparatus responsive to a parameter of a gaseous medium, comprising a chamber for receiving the gaseous medium, a pair of electrodes in the chamber and arranged to have different equilibrium oxygen partial pressures, means for injecting ionising radiations into the chamber, and high input impedance detecting circuitry for detecting an electrical potential difference appearing between the electrodes.

According to the invention, there is further provided a method of gas detection, comprising the steps of passing a gaseous medium over two electrodes in succession, subjecting the gaseous medium to ionising radiations before it reaches the second electrode, and detecting the electrical potential difference between the electrodes, whereby the potential difference depends on the relative proportions of positive and negative ion-forming gases in the gaseous medium, and/or the rate of flow of the gaseous medium.

According to the invention, there is yet further provided gas responsive apparatus, comprising means defining a passage along which a gaseous medium can be passed in a predetermined direction, two electrodes mounted apart in the passage so that the gaseous medium flows over them, means for subjecting the gaseous medium to ionising radiations before it reaches the second electrode, and high input impedance detecting circuitry connected to the two electrodes to detect the electrical potential difference between the electrodes, whereby the potential difference depends on the relative proportions of positive and negative ion-forming gases in the gaseous medium, and/or the rate of flow of the gaseous medium.

Apparatus embodying the invention, and methods according to the invention, will now be described, by way of example, with reference to the accompanying drawings in which.

Figure 1:
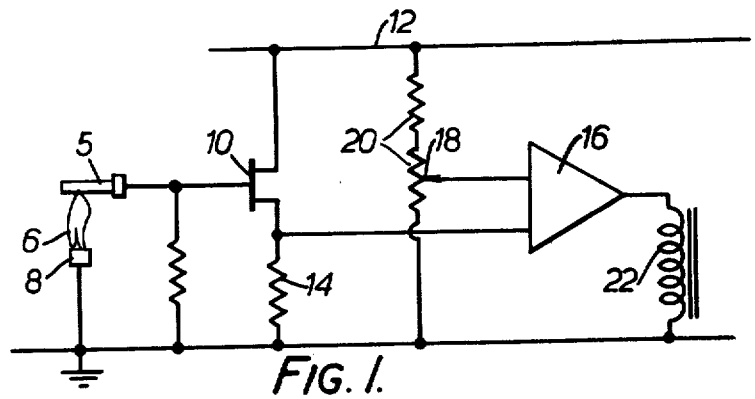
FIG. 1 is a schematic diagram of one form of the apparatus, for detecting the presence of a flame, and shows the electrical connections of the apparatus.

As shown in FIG. 1, the apparatus comprises a probe 5 which is mounted so that the flame 6 whose presence is to be detected impinges on it. The burner 8 from which the flame 6 is emitted and which is in good electrical contact with the flame is connected to earth. The prove 5 is connected to the gate electrode of an impedance-converting field effect transistor 10 whose source and drain electrodes are connected between a supply voltage line 12 and earth in series with a load resistor 14. The voltage across the load resistor 14 is applied to a trigger circuit 16 (such as a Schmitt trigger circuit) whose triggering level is adjustable by means of a tapping 18 on a potential divider 20 connected between the line 12 and earth.

The output of the trigger circuit 16 energises a relay coil 22, having contacts (not shown).

In operation, it is found that a voltage is generated by the flame 6 itself and is picked up by the probe 5, the voltage appearing between the probe and the burner 8. This voltage is applied to the monitoring circuit comprising the impedance converting transistor 10 and the adjustable trigger 16, and holds the trigger 16 in the condition in which it energises the relay coil 22. In the event of "flame-out" conditions (that is, disappearance of the flame 6), the voltage picked up by the probe 5 disappears and the trigger 16 switches into its opposite state. Relay coil 22 becomes de-energised thus changing over its contacts to give a warning signal.

It will be appreciated that no external voltage is applied to the probe 5, the only voltage thereon being that developed by the flame 6 itself. The voltage produced may be of the order of 1 volt.

The output impedance of the voltage produced at the probe 5 by the flame depends on the degree of ionisation in the flame, and in a hot hydrocarbon air flame the impedance can be as low as 100 K ohms. An input impedance to the monitoring circuit of less than 1 megohm can be readily employed, while still enabling an easily detectable voltage to be monitored. By choice of a suitably low input impedance, pick-up noise can be reduced while still maintaining a high speed of response. In cases where the purely resistive input impedance causes excessive pick-up problems, a capacitive shunt can be used to the input though this may reduce the speed of response.

The probe 5 can be made of any suitable electrically conductive material capable of withstanding the temperature of the flame and it can be made of the same material as that of the burner 8. It is not necessary for the material of the probe 5 to be a thermionic emitter at the temperature to which it is raised by the flame, and in at least one example of this form of the apparatus, the probe is made of material which is substantially not a thermionic emitter at the temperature to which it is raised by the flame. The probe 5 may be fluid cooled so that the extent to which its temperature is raised by the flame is limited.

It is not necessary for the flame 6 actually to impinge on the probe 5. The probe 5 can be spaced from the flame, so long as the ionised gas from the flame impinges on the probe.

In a modification, an electrically conductive shield (not shown) can be positioned adjacent to the flame and polarised to attract ions out the of the flame. This modification enables the probe 5 to be spaced from the flame (but in the region into which the ions are attracted) and has advantages where the heat from the flame would otherwise damage the material of the probe.

The voltage produced at the probe 5 is produced by a battery effect for which an explanation will now be put forward.

For a given material at a given temperature, there is a particular oxygen partial pressure with which its surface is in equilibrium, that is, at this oxygen partial pressure, the formation and decomposition of the oxide of the material are balanced. If the temperature is increased, the equilibrium oxygen partial pressure will increase. At any given temperature, different materials, have different equilibrium oxygen partial pressures. The equilibrium oxygen partial pressure at the surface of the material can be represented as an energy level.

In the case being considered, the probe 5 and the burner 6 are made of the same material but, in the presence of the flame, are at different temperatures. Thus, different equilibrium oxygen partial pressures develop at their surfaces. The different energy levels represented by these different partial pressures are manifested as an electrical potential difference which appears between the probe 5 and earth.

The equilibrium oxygen pressures referred to above arise at the material/oxide interface. If the electrode material is incapable of forming a stable oxide, or (whether or not the electrodes are made of such material and whether or not they are made of the same material) if the equilibrium partial pressure or pressures at the electrodes is or are higher than that dictated by the oxygen concentration in the zone in which each electrode is placed, then an equilibrium oxygen partial pressure will not arise. In such a case, the electrical potential produced will arise as a result of the different oxygen partial pressures imposed on the two electrodes by the flame itself and is not dependent on there being a temperature difference between the electrodes. Furthermore, it is not essential that the partial pressure difference be a difference in oxygen partial pressure.

It will be appreciated that the body of the flame provides ionised particles which act as an electrolyte and reduce the impedance of the battery formed in the manner explained above.

Since (at least in the case where the electrode material is oxidisable) the electrical potential produced is produced by a battery effect, care must be taken to avoid undue discharge of the battery. Complete discharge would in fact be represented by complete oxidation of the electrode material. However, well before that stage is reached, the build-up of the oxide films on the electrodes would have increased the battery impedance to an impractical extent.

The very high input impedance of the field effect transistor 10 avoids this condition araising, but if it is not practical to use such a read-out means, because of environmental conditions causing resistive leakage for example, then a charge/discharge method of reading the voltage could be used. In such a method, an external voltage would be applied between the probe 5 and the burner 6 with a polarity opposite to that produced by the flame. For read-out, this external voltage would be disconnected and the voltage produced at the probe would then be monitored in the manner explained.

Figure 2:
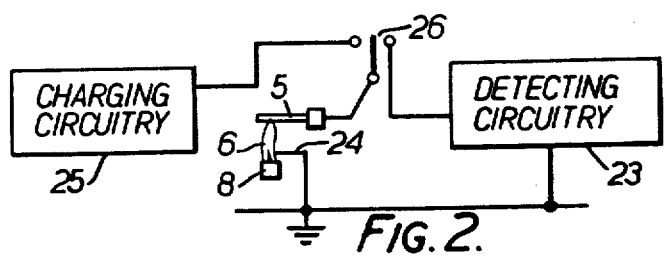
FIGS. 2 and 3 are schematic diagrams showing modifications to the apparatus of FIG. 1, some of the parts being shown in block form in these FIGS.

In a modification shown in FIG. 2 in which the circuitry for detecting the voltage on the probe 5 is represented by a box 23, the burner 8 is not earthed, but the earth path is provided by a second probe 24 which is impinged by the flame 6. This additional probe and the probe 5 should be placed at different reaction zones in the flame. For example, the additional probe 24 could be near the burner 8 where the combustion process is just starting in contrast to the position of the probe 5 at the tip of the flame. The mode of operation is as explained in connection with FIG. 1. The two probes 5 and 24 are made of the same material.

FIG. 2 also shows a second unit 25 which can be connected across the probes 5 and 24 through a changeover switch 26 to apply the charging voltage referred to above. When read-out is desired, the unit 25 is disconnected by means of the switch 26 and the detecting circuitry 23 connected instead.

Figure 3:
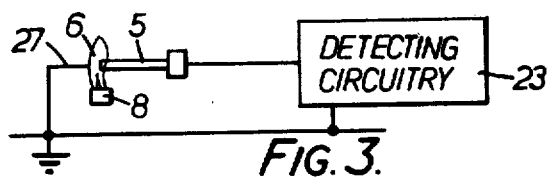

In a further modification shown in FIG. 3 in which the circuitry for detecting the voltage on the probe 5 is again represented by a box 23, two probes 5 and 27 are placed in the same reaction zone of the flame, that is, in a zone across which the oxygen partial pressure is substantially the same. In this modification, the probes are made of different materials. Therefore, in accordance with the theory given above, the equilibrium oxygen partial pressures at the two probes will be different even though the probes are at the same temperature. In the presence of the flame, a voltage difference is produced between the probes which is related to the materials used. It is found, for example, that with a certain type of flame, probes respectively made of aluminum and copper pick up a voltage between them, in the presence of a flame, of about 1.8 volts, whereas probes respectively made of copper and iron produce a voltage of the order of 0.4 volts. As before, the flame effectively acts as an electrolyte between the two probes, and the voltage is generated by a battery effect. In order to avoid discharging the battery formed by the two probes and the flame under prolonged read-out conditions, the charge/discharge method of reading the voltage could be used.

If two probes of different materials are respectively inserted into different reaction zones of the flame, the voltage due to the difference in probe material will either add to or subtract from (depending on the relative positioning of the two probes) the voltage generated by reason of the temperature difference of the probes. For example, in a coal gas/air flame the voltage between a copper burner and an aluminium probe inserted into the flame at a zone thereof spaced from the burner was found, in one example, to produce a voltage of the order of 2.5 volts. When an iron probe was substituted for the aluminium probe, the voltage was reduced to 1.1 volts. An aluminium burner with a copper probe was found to produce a voltage of the order of 0.5 volts.

If the single probe 5, or one of the probes in the cases were there are two probes, is placed in the outer sheath of the flame, flame flicker can be monitored by the variation which it produces in the voltage generated.

It will be appreciated that the apparatus described with reference to FIGS. 1 to 3 is inherently fail-to-safety in that a short circuit between the probe 5 and the burner or between the two probes produces the same effect as a flame-out condition.

Although the apparatus described with reference to FIG. 1 has been put forward as a flame-out detector, it could instead be used as a flame presence detector so as to produce an output signal in the event of detection of a flame.

It would be possible to monitor damage to the probe 5 by introducing an ionising source positioned to ionise the air between the probe 5 and the burner 8. In the absence of the flame, the ionising source would be arranged to produce a lower voltage then produced by the flame. This lower voltage would indicate "flame-out". In the event of breakage in the probe (or short-circuit between the probe and the burner), there would be no voltage at all under "flame-out" conditions and this would indicate a fault in the apparatus.

Figure 4:
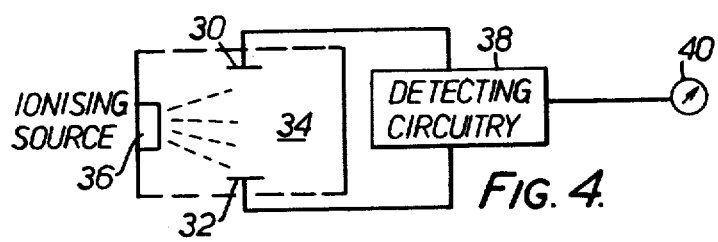
FIG. 4 is a schematic diagram showing another form of the apparatus, which can be used for detecting temperature changes or for detecting gases.

In FIG. 4, two electrodes 30 and 32 are spaced apart in an oxygen atmosphere 34 which is partially ionised by a radioactive source 36, such as an alpha particle emitter. The two electrodes 30 and 32 are made of different materials. Therefore, in the manner explained above in connection with FIG. 1, the equilibrium oxygen partial pressures at the two electrodes will differ and will produce voltage between them. This voltage is detected by suitable circuit means 38, such as incorporating a high input impedance amplifier, and indicates on a measuring instrument 40. As explained, the oxygen partial pressures in equilibrium over different electrode materials vary with temperature. However, equilibrium pressure/temperature relationship is not the same for all materials. Thus, by selecting two materials for the electrodes whose relationships differ to a significant extent, the voltage developed between the electrodes 30 and 32 can be made to be dependent on temperature, and thus the reading of the instrument 40 is a measure of the temperature of the electrodes and the atmosphere between them. In a preferred form of the apparatus, one of the electrodes is made of carbon, whose oxygen partial pressure falls as the temperature increases, while the other electrode is made of a material, such a nickle for example, whose oxygen partial pressure rises with increase in temperature.

In effect, the ionised air is acting as an electrolyte between the two electrodes, and the output voltage produced between them is again effectively a battery output. For this reason, a charge/discharge method of reading the output voltage, such as described above, may be preferable to avoid discharging the battery under prolonged read-out conditions.

Apparatus of the same general form as FIG. 4 can also be used to detect the presence of gases, such as the presence of oxygen in an atompshere.

In such an application, one of the electrodes (electrode 30, say) would be selected to have a low equilibrium oxygen partial pressure while the other electrode (electrode 32) would be selected to have a very high equilibrium oxygen partial pressure. The radioactive source 34 produces ionisation in the gas between the two electrodes. If the partial pressure of oxygen in the atompshere between the electrodes is higher than the equilibrium oxygen partial pressure over each of the electrodes, then the voltage produced between the electrodes will be dependent on the difference between the two equilibrium oxygen partial pressures in the manner explained in connection with FIG. 1. If the partial pressure of the oxygen in the gas between the electrodes is less than the equilibrium oxygen partial pressure of the electrode 32 but greater than that of the electrode 30, then the voltage sensed by the circuit 38 and indicated on the instrument 40 is determined by the pressure difference between the equilibrium oxygen partial pressure of electrode 30 and the partial pressure of the oxygen in the space between the electrodes: this is because the oxygen partial pressure in the space now governs the actual oxygen partial pressure at the electrode 32. Therefore, the voltage sensed by the circuit 38 is related to the concentration of oxygen in the gas between the electrodes.

In this form, the apparatus could be set up to detect the pressure of a reducing gas, such as a pollutant, in the atmosphere in the space between the electrodes, since the presence of such a gas would have the reverse effect to the oxygen. It would be possible to distinguish between different gases by varying the strength of the ionsing source 36; since different gases ionise at different levels, the strength of the source 36 would be reduced until the output disappeared, and the strength of the source 36 when this occurred would identify the gas.

As in the case of FIG. 1, the voltage produced is effectively a battery output, and a charge/discharge method of reading the output voltage, such as described above, may be preferable to avoid discharging the battery under prolonged read-out conditions.

Examples of materials which may be used for the electrodes are aluminium for the low oxygen partial pressure electrode and copper for the other electrode.

The apparatus in this form may be slightly temperature sensitive since temperature may affect the oxygen partial pressures of the two electrodes differently. This could be overcome using the same materials for the electrodes and maintaining a constant temperature difference between them (since the electrode materials are the same, the temperature difference is required in order to produce the partial pressure-dependent output).

When the pressure of the oxygen in the space between the electrodes becomes greater than that of the high pressure electrode, the voltage produced between the electrodes reaches a maximum value.

Figure 5:
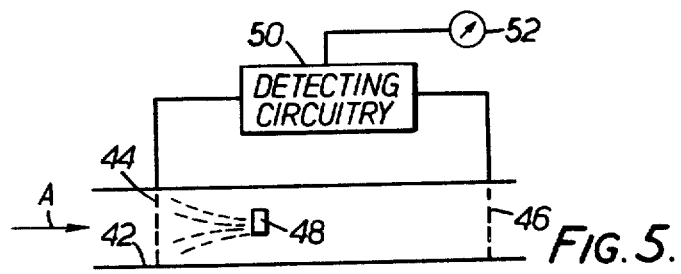
FIG. 5 is a schematic view of a further form of the apparatus for detecting gases.

In FIG. 5, an electrically non-conductive tube 42 is provided with two electrodes 44 and 46 which are spaced apart on the tube and are designed so as not to prevent gas flow through the tube: they may, for example, be of grid form. Also mounted in the tube is a radioactive source 48 which directs ionising particles towards the electrode 44 and at least partially ionises gas entering the tube 42 in the direction of the arrow A. The voltage between the electrodes is monitored by a measuring circuit 50 which may incorporate a high input impedance amplifier and which controls a measuring instrument 52.

In operation, it is found that oxygen flowing in the direction of the arrow A in the tube causes electrode 46 to assume a negative potential with respect to electrode 44, and this is indicated on the instrument. If, on the other hand, hydrogen flows through the tube instead of the oxygen, it is found that electrode 46 becomes positive with respect to electrode 44.

It is believed that the ions produced as a result of the ionisation of the incoming gas by the source 48 recombine at or near the electrode 46, causing electrons to be dumped or taken up, depending on the polarity of the ions.

If a mixture of gases flows through the tube 42, then the resultant potential between the electrodes will depend on the relative amounts of the two gases, though may also be dependent to some extent on the ease with which they are ionised. If, for example, a mixture of hydrogen and oxygen flows through the tube, the instrument 52 could be calibrated to indicate when the proportions of the gases in the mixture are explosive. It will be appreciated that the gas detector apparatus shown in FIG. 5 does not involve any heating of the gas and thus avoids the dangers inherent in such heating.

The apparatus of FIG. 5 can also be used as a flow sensor. If the composition of the gas remains constant, the potential difference picked up between the electrodes is dependent on the gas flow.

What we claim is:

1. In a method of detecting a physical parameter by sensing for an electrical potential generated in dependence thereon, the steps of
   selecting two electrode materials such that over each of the materials a predetermined gas has a different equilibrium partial pressure when the materials are at the same temperature,
   mounting two electrodes closely adjacent but separated from each other, the electrodes being respectively made of the two selected materials,
   establishing an electrolyte between the electrodes and holding different gaseous partial pressures at the two electrodes, and
   sensing a self-generated electrical potential difference appearing between the electrodes in dependence on said parameter.

2. In a method according to claim 1, in which
   the electrodes are made of different oxidisable materials and have different equilibrium oxygen partial pressures over them in oxygen-containing atmosphere when at the same temperature, and
   said step of establishing said electrolyte between the electrodes and holding different partial pressures at the electrodes includes the step of accentuating the difference in equilibrium oxygen partial pressures by holding the electrodes at different temperatures.

3. In a method according to claim 2, in which said physical parameter is a flame whose presence both establishes the electrolyte between the electrodes and holds the different partial pressures at the electrodes and in which the level of said potential difference indicates whether the flame is present.

4. In a method of detecting a physical parameter by sensing for an electrical potential generated in dependence thereon, the steps of
   selecting two different oxidisable electrode materials which have different equilibrium oxygen partial pressures in an oxygen-containing atmosphere when at the same temperature,
   mounting two electrodes closely adjacent but separated from each other, the electrodes being respectively made of the two said selected electrode materials,
   establishing an electrolyte between the electrodes,
   establishing an oxygen-containing atmosphere at the electrodes, and
   holding the electrodes at substantially the same temperature.

5. In a method according to claim 4, in which said physical parameter is a flame whose presence establishes the electrolyte between the electrodes and establishes said oxygen-containing atmosphere at the electrodes, and in which the level of said potential difference indicates whether the flame is present.

6. In a method according to claim 3, including the step of subjecting the area between the electrodes to ionising radiations so as to develop a potential difference between the electrodes in the absence of the said flame, which potential difference is lower in magnitude than that appearing at the electrodes in the presence of the flame.

7. In a method according to claim 1, in which
   the two electrodes are made of different oxidisable materials and have different equilibrium oxygen partial pressures over them in an oxygen-containing atmosphere, and
   said step of establishing, the electrolyte between the electrodes and holding different gaseous partial pressures at the two electrodes comprises the step of establishing an ionised gaseous medium between the two electrodes whose oxygen partial pressure is altered by changes in said parameter which thus alters the difference between the oxygen partial pressures at the two electrodes and said potential difference accordingly.

8. In a method according to claim 7, including the step of varying the strength of radiations ionising the said gaseous medium, and monitoring the change if any in the potential difference whereby to identify a gas in the gaseous medium.

9. In a method according to claim 1, in which
   the two electrodes are made of different oxidisable materials and different equilibrium oxygen partial pressures exist over them in an oxygen-containing atmosphere,
   said step of establishing the electrolyte between the electrodes and holding different gaseous partial pressures at the electrodes comprises the step of establishing an ionised oxygen-containing gaseous medium between the electrodes, and
   said step of sensing a self-generated electrical potential difference appearing between the electrodes in dependence on the parameter comprises the step of sensing changes in the value of said potential difference in response to changes in the ambient temperature of the electrodes.

10. In a method according to claim 1, the steps of:
    applying an externally generated potential difference to the electrodes with polarity opposite to that of the potential difference appearing therebetween, and then removing the externally generated potential difference before detecting the potential difference appearing between the electrodes.

11. Apparatus responsive to a parameter of a gaseous medium, comprising
a chamber for receiving the gaseous medium,
a pair of electrodes arranged to have different equilibrium oxygen partial pressures over them,
means mounting the electrodes in the chamber,
means for injecting ionising radiations into the chamber, and
high input impedance detecting circuitry for detecting a self-generated electrical potential difference appearing between the electrodes.

12. Apparatus according to claim 11, in which the electrodes are made of different oxidisable material, whereby the said potential difference is dependent on the oxygen partial pressure in the gaseous medium between the electrodes and on the ambient temperature of the gaseous medium and the electrodes.

13. Apparatus according to claim 11, in which the electrodes are made of the same oxidisable material, and including means for maintaining a substantially constant temperature difference between the two electrodes, whereby the said potential difference is dependent on the oxygen partial pressure in the gaseous medium between the electrodes.

14. Apparatus according to claim 11, including means for varying the strength of the ionising radiations whereby the resultant variation in the said potential difference is dependent on the identity of a gas present in the gaseous medium.

15. Apparatus according to claim 11, in which one electrode is made of a material whose equilibrium oxygen partial pressure falls as the temperature increases, while the other is made of a material whose equilibrium oxygen partial pressure rises with increase in temperature.

* * * * *